(12) United States Patent
Suzuki et al.

(10) Patent No.: US 6,763,059 B2
(45) Date of Patent: Jul. 13, 2004

(54) SPREAD SPECTRUM SIGNAL DEMODULATOR

(75) Inventors: Toshinori Suzuki, Tokyo (JP); Yoshio Takeuchi, Saitama (JP)

(73) Assignee: DDI Corporation, Tokyo (JP)

( * ) Notice: Subject to any disclaimer, the term of this patent is extended or adjusted under 35 U.S.C. 154(b) by 761 days.

(21) Appl. No.: 09/730,762

(22) Filed: Dec. 7, 2000

(65) Prior Publication Data

US 2001/0003531 A1 Jun. 14, 2001

(30) Foreign Application Priority Data

Dec. 9, 1999 (JP) .......................................... 11-350501

(51) Int. Cl.⁷ .............................................. H04B 1/707
(52) U.S. Cl. ...................................................... 375/148
(58) Field of Search ................................ 375/148, 150, 375/144, 142; 370/342, 441

(56) References Cited

U.S. PATENT DOCUMENTS 5,677,930 A * 10/1997 Bottomley ................... 375/150
5,724,378 A * 3/1998 Miki et al. ................... 375/148

OTHER PUBLICATIONS

Hosur et al, "Adaptive Multiuser Receiver Schemes for Antenna Arrays," 1995, IEEE, pp. 940–944.*

* cited by examiner

Primary Examiner—Stephen Chin
Assistant Examiner—Kevin Kim
(74) Attorney, Agent, or Firm—Westerman, Hattori, Daniels & Adrian, LLP (57) ABSTRACT

This invention provides a spread spectrum signal demodulator in which a noise component included in respective demodulation symbols is reduced and an effect of interference removal is further improved. Symbol decorrelating means detect correlations between spread codes allocated to spread spectrum signals to be removed and a receiving signal. A symbol deciding means 121 synthesizes one or the plurality of one symbol correlation values b1 to bk in common phase, namely, diversity-synthesizes them so as to decide a symbol. As the symbol decision, hard decision or soft decision can be used. Correlation modification means input the one symbol correlation values b1 to bk output from the symbol decorrelating means and the symbol decided result output from the symbol deciding means 121 thereinto, and modify the symbol correlation values b1 to bk. The modified symbol correlation values d1 to dk are transmitted into interference replicating means so as to be spectrum-spread by corresponding spread codes.

11 Claims, 8 Drawing Sheets

$$S = \frac{1}{m} \sum_{\tau=j+1}^{j+m} s_\tau \cdot \hat{d}^*_\tau \quad \cdots \cdot (6)$$

$$S = \frac{1}{m} \sum_{\tau=j+1}^{j+m} (a d_\tau + n_\tau) d^*_\tau = a + \frac{1}{m} \sum_{\tau=j+1}^{j+m} n_\tau \cdot d^*_\tau \quad \cdots \cdot (8)$$

$$\hat{s}_\tau = S \cdot d_\tau = a \cdot d_\tau + \frac{1}{m} \sum_{\tau=j+1}^{j+m} n'_\tau \quad \cdots \cdot (9)$$

$$n'_\tau = n_\tau \cdot d^*_\tau \cdot d_\tau$$

Fig. 10 PRIOR ART

SPREAD SPECTRUM SIGNAL DEMODULATOR

BACKGROUND OF THE INVENTION

1. Field of the Invention

This invention relates to a spread spectrum signal demodulator, and more particularly, to a spread spectrum signal demodulator which is used for cellular communication systems, indoor wireless communication systems, wireless LAN (local area network) systems, etc. and in which an interference removing ability is improved.

2. Description of the Related Art

In communication by means of a spread spectrum signal, modulation symbols to be transmitted are further modulated by high-speed spread codes (this is called as a secondary modulation), and information is transmitted as a signal having a spectrum width not less than an information bandwidth. On a receiving side, a receiving signal is inversely spread and modulated symbols are extracted. Here, the inverse spread is a process for convolutionally integrating a conjugate complex of the spread code allocated to one-modulation symbol and the received signal. A symbol correlation value obtained as the integrated result is a demodulation symbol, and in the conventional technique, the correlation value for one symbol is directly subject to extraction of transmission information as the demodulation symbol.

Modulation symbols are obtained by directly modulating transmission information or by coding the transmission information for error correction and modulating the transmission information. As a receiving method, there exist a method of directly extracting transmission information from demodulation symbols and a method of replicating an interference component from demodulation symbols in an interference station and subtracting the interference component from a receiving signal so as to extract objective transmission information.

Figure 10:
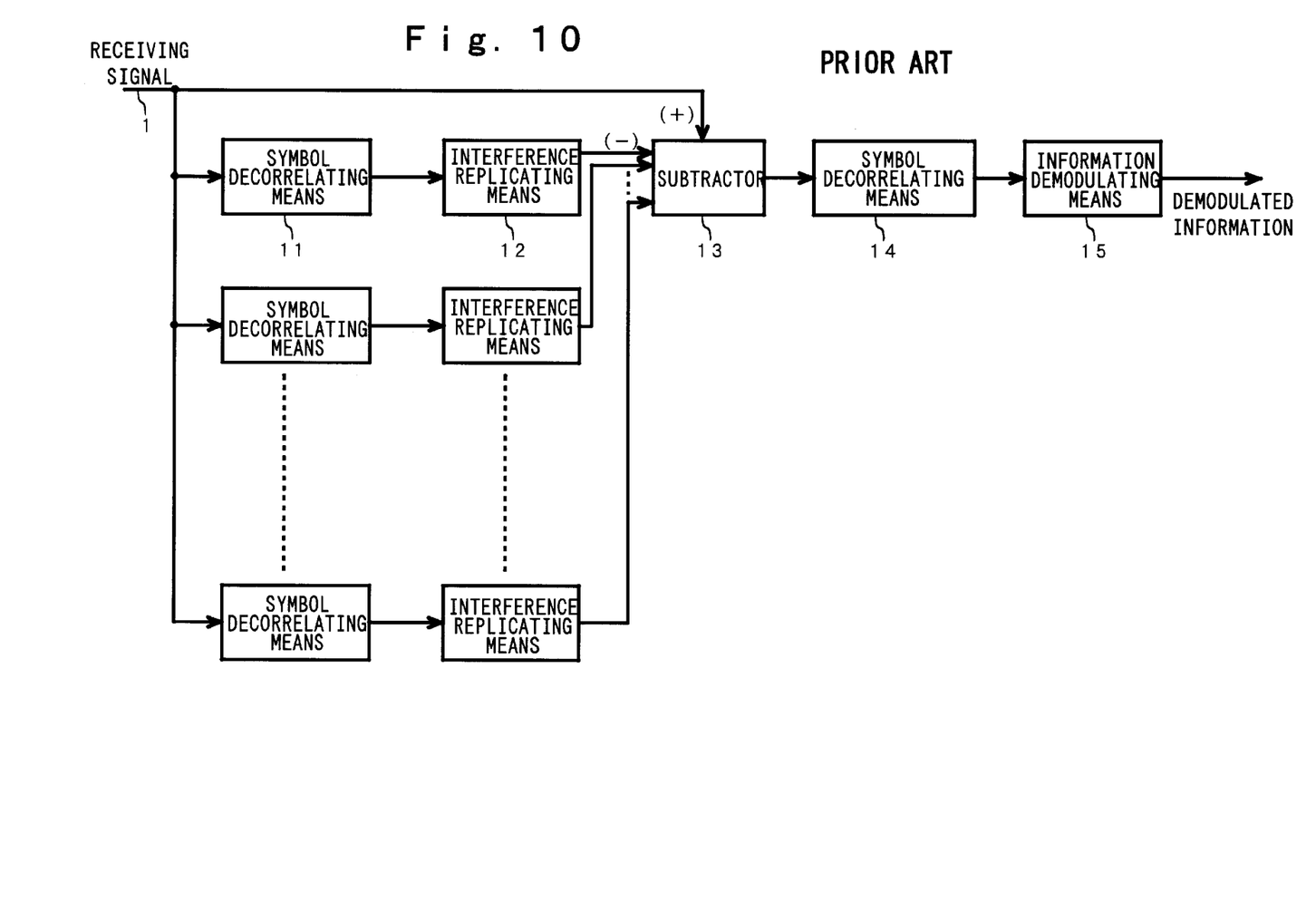
FIG. 10 is a block diagram showing one example of a conventional apparatus.

There will be explained below an example of the latter receiving method, namely, the receiving method utilizing interference removal which is applicable regardless of existence/non-existence of a pilot symbol with reference to FIG. 10. A receiving signal 1 is input into symbol decorrelating means 11 and a subtracter 13. The symbol decorrelating means 11 obtain a correlation value for one symbol and outputs it to interference replicating means 12. The interference replicating means 12 respread the input correlation values according to timing of transmission symbols so as to create replications of respective spread spectrum signals included in the receiving signal. The subtracter 13 removes the replicated signals from the receiving signal 1, and a symbol decorrelating means 14 obtains a correlation value between the receiving signal from which the replicated signals have been removed and spread codes allocated to the respective spread spectrum signals included in the receiving signal. An information demodulating means 15 demodulates the correlation value so as to output the demodulated value as demodulation information.

Next, there will be explained below a receiving means which is capable only to a transmission system where a pilot symbol exists with reference to FIG. 11. Here, since the components shown by the same reference numerals as those in FIG. 10 have the same or equivalent functions, the description thereof is omitted. Channel estimating means 16 estimate channel states from pilot symbols decorrelated by the symbol decorrelating means 11, and symbol deciding means 17 temporarily decide symbols from correlation value for one symbol. The interference replicating means 12 multiply the temporarily decided results by the channel estimated values and they are replications of interference components.

The above-mentioned conventional receiving means utilizing interference removal have a problem that since individual demodulation symbols are decided from a correlation value for one symbol, a noise component included in the correlation value for one symbol deteriorates the quality of a replicated interference signal, and accuracy of the interference removal is lowered.

SUMMARY OF THE INVENTION

It is an object of the present invention to provide a spread spectrum signal demodulator in which a noise component included in respective demodulation symbols is reduced and an effect of interference removal is improved.

In order to accomplish the above object, the present invention is first implemented by comprising symbol decorrelating means for decorrelating symbol correlation values between spread codes allocated to spread spectrum signals and a receiving signal; a symbol deciding means for deciding a transmission symbol based on the symbol correlation values decorrelated by said symbol decorrelating means; and correlation modification means for modifying the symbol correlation values based on the symbol decided result decided by said symbol deciding means, wherein a noise component included in respective demodulation symbols is reduced.

The present invention is second implemented by comprising symbol decorrelating means for decorrelating symbol correlation values between spread codes allocated to spread spectrum signals and a receiving signal; a symbol with reliability deciding means for deciding a transmission symbol based on the symbol correlation values decorrelated by said symbol decorrelating means and outputting reliability of the symbol decided result; and correlation modification means for modifying the symbol correlation values based on the symbol decided result decided by said symbol with reliability deciding means.

According to the first and second characteristics of the present invention, while a pilot symbol free which is a characteristic of a conventional replicated signal removing means according to soft decision basis (to be applicable even into a system where known information such as a pilot symbol for estimating channel state is not transmitted) is being maintained, an interference removing ability can be improved. Moreover, even in the case where the present invention is applied to a transmission system where a pilot symbol exists, the interference removing ability can be improved similarly.

DETAILED DESCRIPTION OF THE PREFERRED EMBODIMENT

Figure 1:
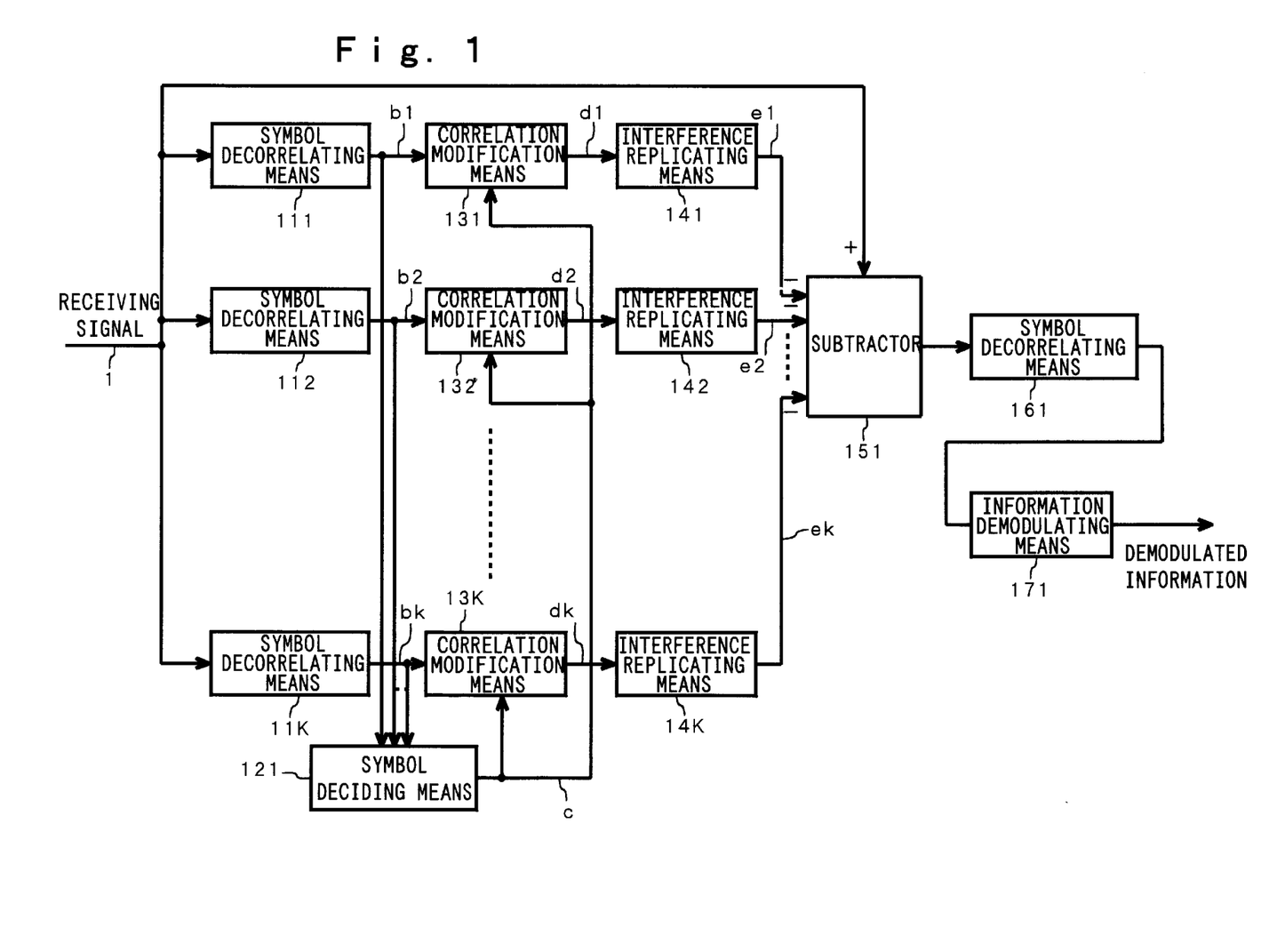
FIG. 1 is a block diagram showing a structure according to a first embodiment of the present invention.

There will be detailed below the present invention with reference to the drawings. FIG. 1 is a block diagram showing the structure of a spread spectrum signal demodulator according to one embodiment of the present invention. This embodiment is, needless to say, applicable to a transmission system where a pilot symbol exists and also to a transmission system where a pilot symbol does not exist.

Symbol decorrelating means 111 to 11K detect correlations between spread codes allocated to spread spectrum signals to be removed and a receiving signal, and it is realized by a decorrelator, a matched filter or equivalent ones.

Figure 2:
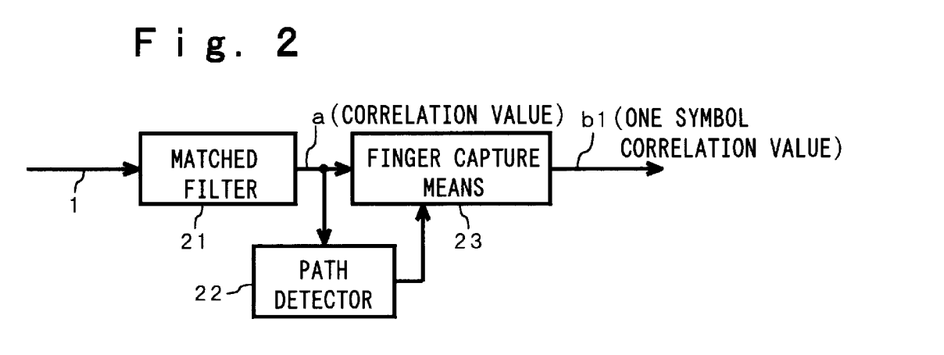
FIG. 2 is a block diagram showing one concrete example of a symbol decorrelating means of the present embodiment.

FIG. 2 is a block diagram showing one concrete example that the symbol decorrelating means 111 is composed of a matched filter. Here, since the symbol decorrelating means 112 to 11K have the same structure as that of the symbol decorrelating means 111, the description thereof is omitted. A matched filter 21 obtains a correlation value a between the receiving signal 1 and the spread code. A path detector 22 detects existence of an objective signal from the correlation value. A finger capture means 23 captures the correlation value a based on the detected path information (a kind of timing information) so as to output it as a one symbol correlation value b1.

A symbol deciding means 121 synthesizes one or a plurality of one symbol correlation values b1 to bk in common phase, namely, diversity-synthesizes them so as to decide a symbol. As the symbol decision, hard decision for outputting only a code, or a symbol decision with reliability for outputting reliability of the result of symbol decision, such as soft decision for outputting a code and synthetic signal strength, can be used. The symbol decision with reliability outputs a larger value for the decided result with great certainty, whereas outputs a smaller value for the decided result with small certainty. Namely, a decision is made by weighting the certainty of the decided result. In the case where a reflection object or the like exists in channels or a plurality of receiving channels exist, since one transmission signal is received through a plurality of paths, it is useful to synthesize the plurality of one symbol correlation values b1 to bk in common phase.

Figure 3:
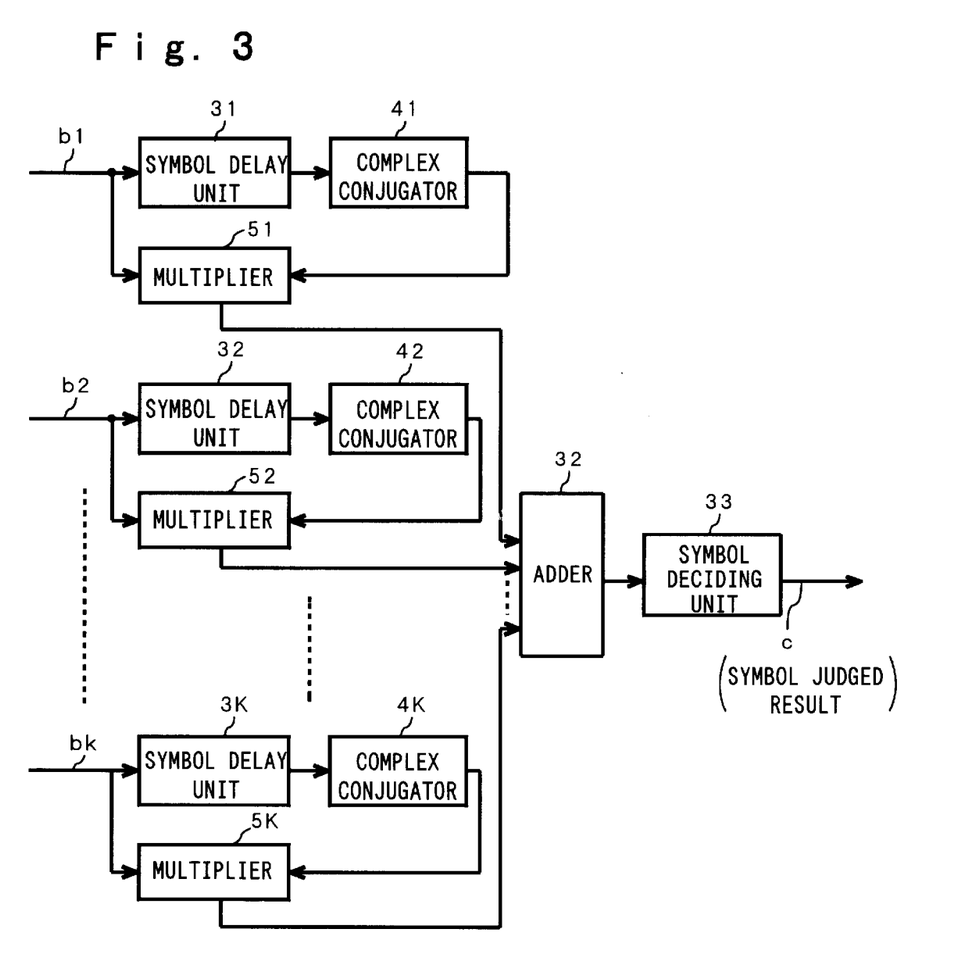
FIG. 3 is a block diagram showing one concrete example of a symbol deciding means of the present embodiment.

FIG. 3 shows one concrete example of the symbol deciding means 121. Symbol correlation values just before the respective one symbol correlation values b1 to bk are stored in symbol delay unit 31 to 3$k$, and their conjugate complex values are output from complex conjugators 41 to 4K. Multipliers 51 to 5K multiply the one symbol correlation values b1 to bk and the outputs of the complex conjugators 41 to 4K so as to output the multiplied values. As a result, phase rotation which is given in the channels is removed, and K-numbered one symbol correlation values can be synthesized in common phase by an adder 25. A symbol decider 26 decides a demodulation symbol from the synthesized one symbol correlation value.

Correlation modification means 131 to 13K input the one symbol correlation values b1 to bk output from the symbol decorrelating means 111 to 11K and the symbol decided result c output from the symbol deciding means 121 thereinto so as to modify the symbol correlation values b1 to bk.

Figure 4:
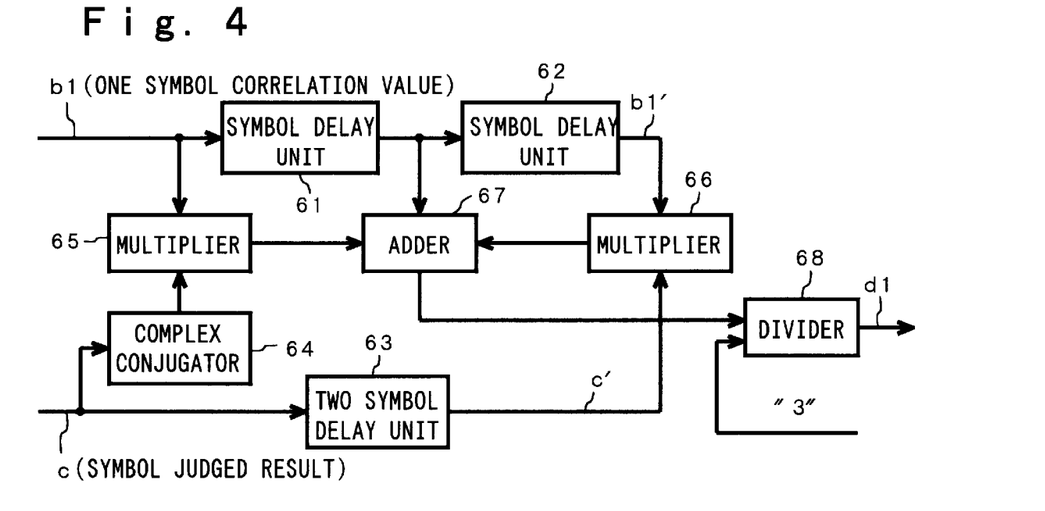
FIG. 4 is a block diagram showing one concrete example of a correlation modification means of the present embodiment.

FIG. 4 shows one concrete example of the correlation modification means 131 for modifying a correlation value based on continuous three-symbol correlation values. Here, the other correlation modification means 132 to 13K have the same structure. The previous two input one symbol correlation values b1 are stored in two symbol delay unit 61 and 62. The symbol judged result c for the previous two symbols are stored in a two-symbol delay unit 63. As for the current symbol judged result c, a conjugate value is calculated by a complex conjugator 64 so as to be multiplied by the current one symbol correlation value b1 in a multiplier 65. Meanwhile, as for the input of two symbols before, a symbol judged result c' of two symbols before and a one symbol correlation value b1' of two symbols before are multiplied by a multiplier 66. These two multiplied results and the one symbol correlation value of one symbol before are added in an adder 67, and the added value (total value) is divided by "3" in a divider 68, and the result is a modified symbol correlation value d1.

The blocks after the correlation modification means 131 to 13K in FIG. 1 are the same as those used in the conventional technique. Namely, interference replicating means 141 to 14K spectrum-spread the symbol correlation values d1 to dk of interference signals by corresponding spread codes, and occasionally shapes waveforms of the spread spectrum signals or suppresses their signal strength so as to output the spread spectrum signals as replicated signals e1 to ek of the interference signals.

Figure 5:
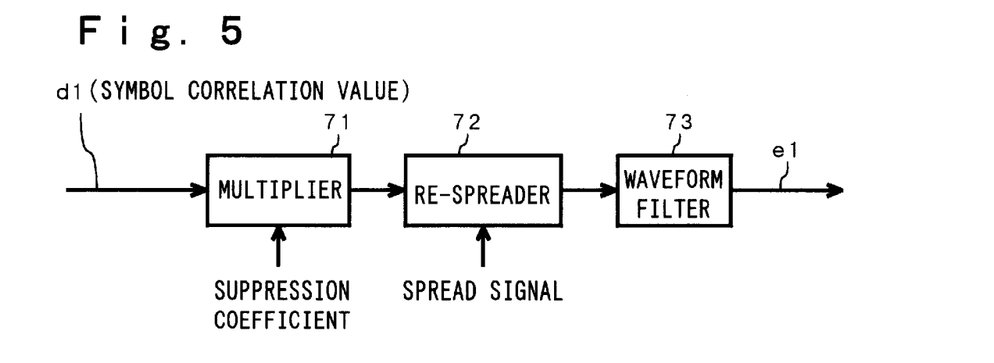
FIG. 5 is a block diagram showing one concrete example of an interference replicating means of the present embodiment.

FIG. 5 is one concrete example of the interference replicating means 141. The other interference replicating means 142 to 14K have the same structure. The input symbol correlation value d1 is multiplied by a suppression coefficient (normally not more than 1) in a multiplier 71 so that its strength is weakened. After the multiplied value is respread by a predetermined spread code in a re-spreader 72, a signal waveform that a bandwidth of the spread signal is limited in a waveform filter 73 is output as a replicated signal e1 of the interference signal.

A subtracter 151 subtracts the replicated signal e1 to ek output from the interference replicating means 141 to 14K from the receiving signal 1 so as to output the obtained signal as a receiving signal from which interference has been removed. A symbol decorrelating means 161 detects a correlation between the dispersion code allocated to the dispersion spectrum signal to be demodulated and the receiving signal from which interference has been removed. An information demodulating means 171 demodulates transmission information based on the objective demodulation symbol, and performs the operation which is the same as that of the symbol deciding means 121 in the case of a transmission system that error correction coding is not executed. Meanwhile, in the case where error correction coding is executed, the information demodulating means 171 performs demodulation according to the coding means.

Next, there will be explained below an effect of the present embodiment using formulas. When a channel state of the spread spectrum signal to be removed is a, the transmission symbol corresponding to time t is $d_t$, the one symbol correlation value corresponding to time output from the symbol decorrelating means 111 is $s_t$, and the noise component included in $s_t$ is $n_t$, the output of the symbol decorrelating means 111 is represented by the following formula (1):

$$s_t = a \cdot d_t + n_t \qquad (1).$$

Here, all the signs are complex numbers. Moreover, for simple explanation, $|d_t|=1$.

A differential symbol decided result c corresponding to time t output from the symbol deciding means 121 is $\Delta\hat{d}_t$. If this decided result is correct, the following formula (2) holds. Here, x* is a conjugate complex of x.

$$\Delta\hat{d}_t = d_t \cdot d^*_{t-1} \qquad (2).$$

The modified correlation value $\hat{s}_t$ corresponding to time t output from the correlation modification means 131 satisfies the following formula (3) according to FIG. 4:

$$\hat{s}_t = \tfrac{1}{3}(s_{t-1} \cdot \Delta\hat{d}_t + s_t + s_{t+1} \cdot \Delta\hat{d}^*_{t+1}) \qquad (3)$$

When the formulas (1) and (2) are substituted into the formula (3), the following formula (4) holds:

$$\begin{aligned}\hat{s}_t &= \tfrac{1}{3}(s_{t-1} \cdot \Delta\hat{d}_t + s_t + s_{t+1} \Delta\hat{d}^*_{t+1}) \\ &= \tfrac{1}{3}[(ad_{t-1}+n_{t-1})d_t \cdot d^*_{t-1} + (ad_t+n_t) + (ad_{t+1}+n_{t+1})d^*_{t+1} \cdot d_t] \\ &= a \cdot d_t \tfrac{1}{3}(n'_{t-1}+n_t+n'_{t+1}) \end{aligned} \qquad (4).$$

Here, $n'_{t-1}=n_{t-1} \cdot d_t \cdot d^*_{t-1}$, $n'_{t+1}=n_{t+1} \cdot d^*_{t+1} \cdot d_t$. Since $|d_t|=1$, a spread value of n' is the same as a spread value of n.

Therefore, an objective signal power included in the demodulation symbol output from the correlation modification means 131 is $a^2$, and when dispersion of n is N, a noise power is $3N/3^2=N/3$. Meanwhile, according to the formula (1), when the objective signal power included in the demodulation symbol output from the one symbol decorrelating means 111 is $a^2$, its noise power is N. Namely, as the effect of the present embodiment, the noise power included in the demodulation symbol is reduced to ⅓.

In the case where the symbol decided result $\Delta\hat{d}_t$ output from the symbol deciding means 121 is incorrect, the noise power becomes larger than ⅓, but if a symbol decision error rate is in a practical level (not more than about 10%), an improved effect can be obtained.

Figure 6:
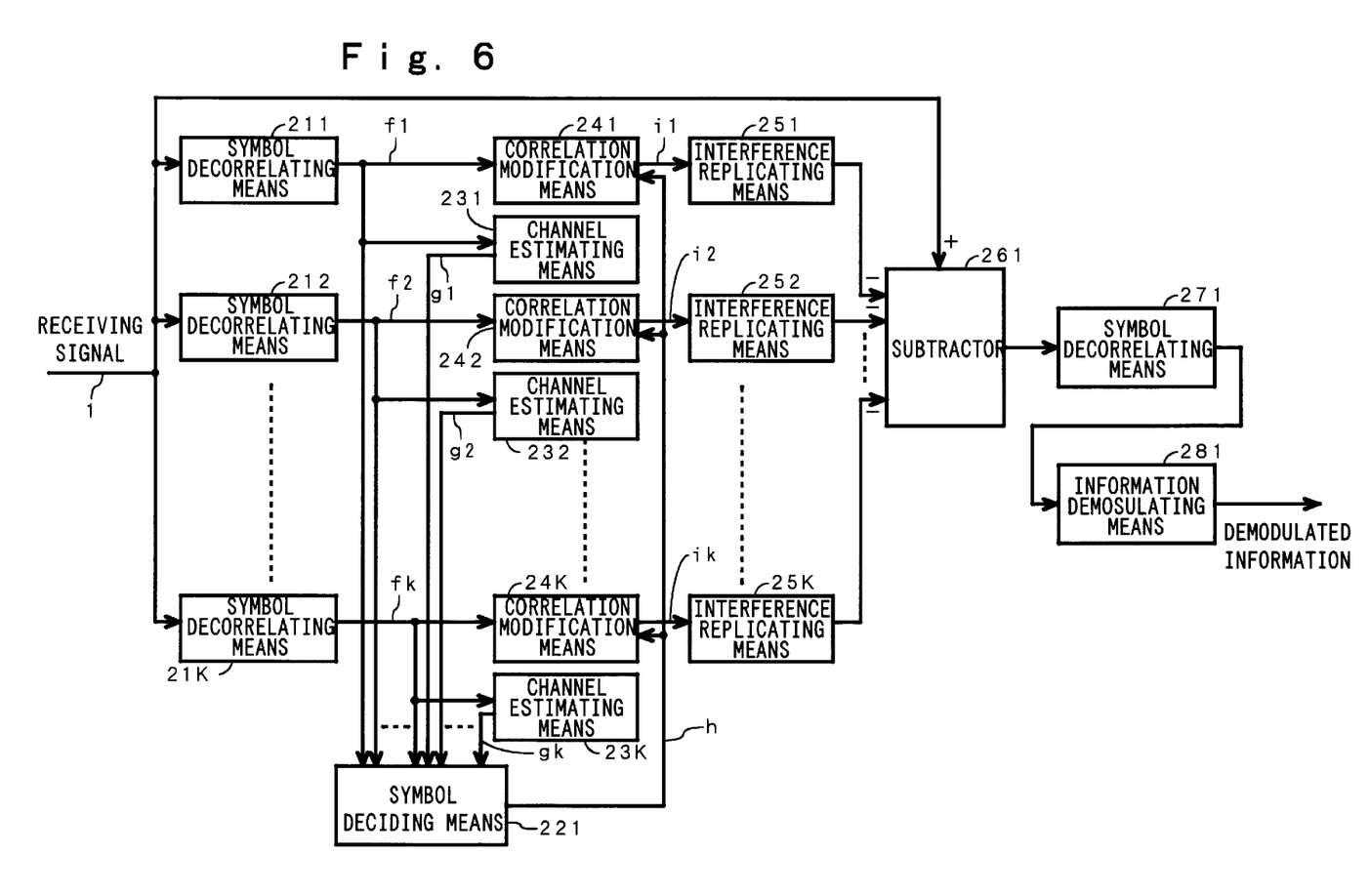
FIG. 6 is a block diagram showing a structure according to a second embodiment of the present invention.

There will be explained below a second embodiment of the present invention with reference to FIG. 6. This embodiment is applicable to a transmission system having a pilot symbol.

Since symbol decorrelating means 211 to 21K have the same or equivalent structure as or to that of the symbol decorrelating means 111 to 11K in the first embodiment, the description thereof is omitted.

Channel estimating means 231 to 23K extract pilot symbols from demodulation symbols, and compare the extracted pilot symbols with a pilot symbol pattern to be originally transmitted so as to estimate states of channels.

A symbol deciding means 221 synthesizes one or the plurality of one symbol correlation values f1 to fk in common phase based on the states of the channels, namely, diversity-synthesizes them so as to decide the symbol. As the symbol decision, hard decision for outputting only a code or symbol decision with reliability for outputting reliability of the symbol decided results, such as soft decision for outputting a code and synthesized signal strength, can be used. In the case where a reflecting object or the like exists in the channels or the plurality of receiving systems exist, since the same transmission signal is allowed to pass through the plurality of channels to be received, the plurality of one symbol correlation values are normally synthesized in common phase.

Figure 7:
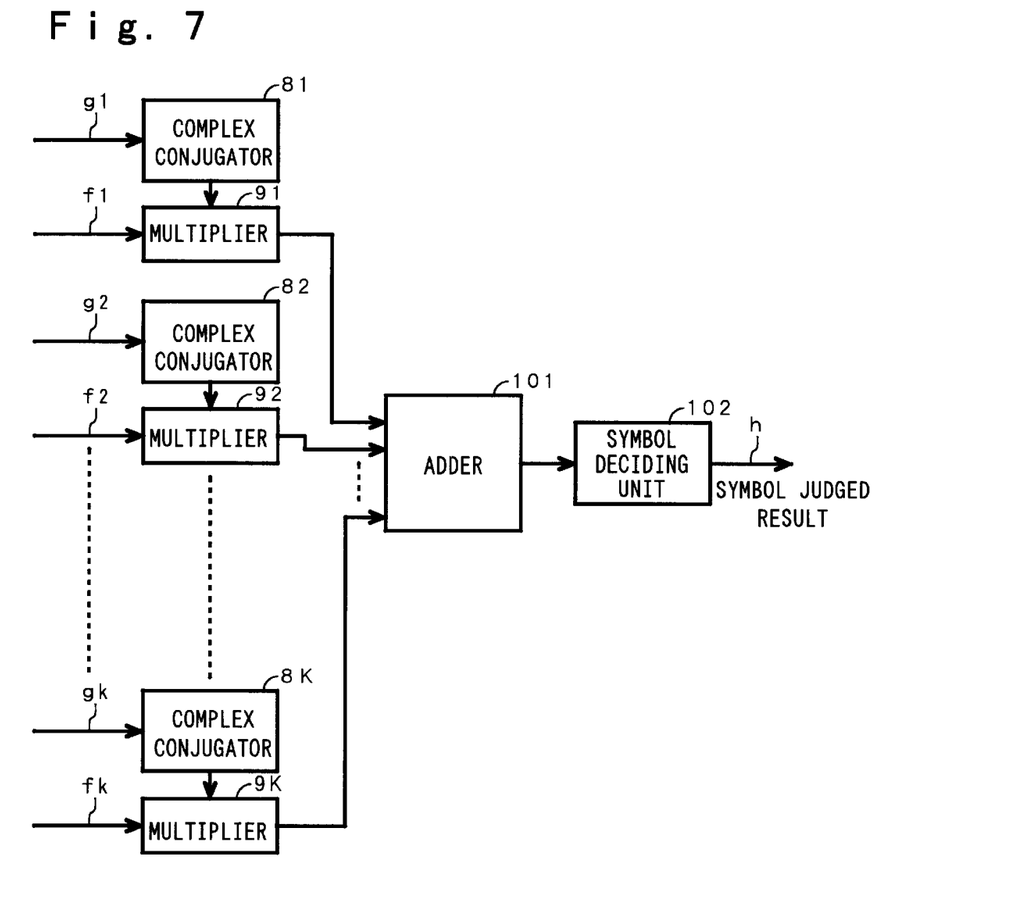
FIG. 7 is a block diagram showing one concrete example of a symbol deciding means of the present embodiment.

FIG. 7 shows one concrete example of the symbol deciding means 221. The one symbol correlation values f1 to fk and corresponding channel estimated values g1 to gk are input into the symbol deciding means 221. After the channel estimated values g1 to gk pass through complex conjugators 81 to 8K so as to be converted into conjugate complexes, these conjugated complexes are multiplied by the one symbol correlation values f1 to fk in multipliers 91 to 9K, and phase rotation given in the channels is removed therefrom. As a result, the plurality of one symbol correlation values f1 to fk can be synthesized in common phase by an adder 101. A symbol decider 102 decides a demodulation symbol from the synthesized one symbol correlation value so as to output a symbol decided result h.

Correlation modification means 241 to 24K input the one symbol correlation values f1 to fk output from the symbol decorrelating means 211 to 21K and the symbol decided result h output from the symbol deciding means 221 thereinto so as to correct the symbol correlation values f1 to fk.

Figure 8:
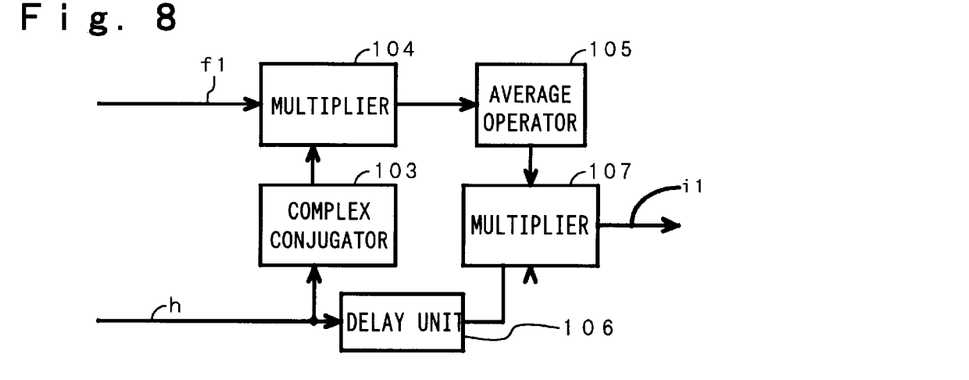
FIG. 8 is a block diagram showing one concrete example of a correlation modification means of the present embodiment.

FIG. 8 shows one concrete example of the correlation modification means 241. Here, the other correlation modification means 242 to 24k also have the same or equivalent structure. The conjugate complex is taken from the input symbol decided result h in a complex conjugator 103 and the symbol decided result h is multiplied by the input one symbol correlation value f1 in a multiplier 104. An average operator 105 obtains an average value of the plurality of symbols for the multiplied result. Meanwhile, a delay unit 106 delays the symbol decided result h by time required for the process of the average operator 105. A multiplier 107 multiplies the output of the average operator 105 by the output of the delay unit 106 so as to output the multiplied value.

The structures after the correlation modifying means 241 to 24K, namely, interference replicating means 251 to 25K, a subtracter 261, a symbol decorrelating means 271 and an information demodulating means 281 have the same as or equivalent to the corresponding means in the first embodiment. Therefore, the description thereof is omitted. Here, symbol correlation values i1 to ik output from the correlation modification means 241 to 24K are input into the interference replicating means 251 to 25K of the present embodiment. On the contrary, symbol correlation values are not input into the conventional interference replicating means 12 shown in FIG. 11, but two kinds of signals of a channel estimated value (output of the channel estimating means 17) and a symbol decided result (output of the symbol deciding means 17) are input thereinto. For this reason, the structures of the interference replicating means 251 to 25K in the present embodiment are different from the structure of the conventional interference replicating means 12.

There will be explained below an effect of the second embodiment using formulas. Signs to be used here have the same meanings as those used in the first embodiment.

The symbol decided result corresponding to time t output from the symbol deciding means 221 is $\hat{d}_t$. If this decided result is correct, the following formula (5) holds:

$$\hat{d}_t = d_t \qquad (5).$$

An average value of the correlation modification means 241 to be obtained in the average operator 105 (see FIG. 8) is S. As an example, when an interval for obtaining the average is continuous m symbol time (m is a positive integer), S is obtained according to the formula (6) shown in FIG. 9.

Next, the output i1 (=$\hat{s}_t$) of the correlation modification means 241 is as represented by the following formula (7):

$$\hat{s}_t = s \cdot \hat{d}_t \text{ (here, } j+1 \leq t \leq j+m\text{)} \tag{7}$$

Figure 9:
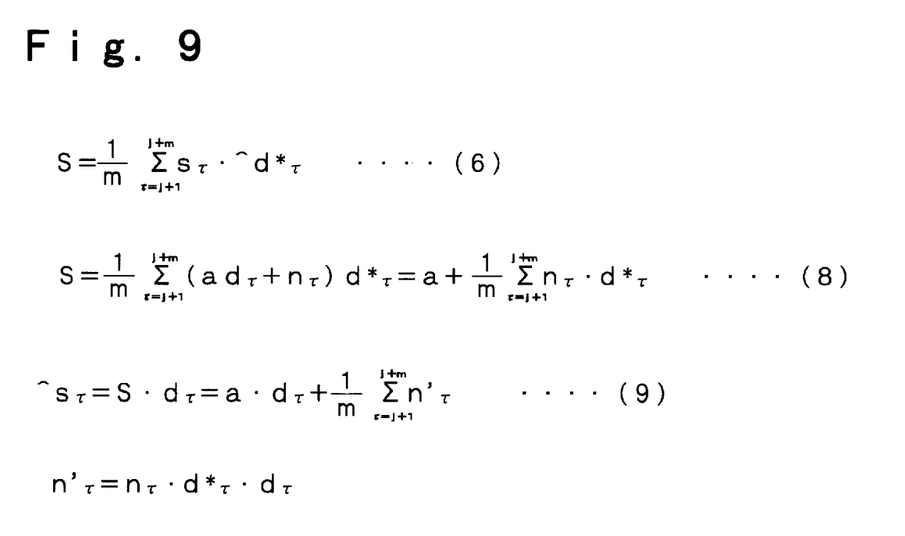
FIG. 9 is an explanatory diagram of formulas.

Next, when the formula (1) is substituted into the formula (6), the formula (8) shown in FIG. 9 is obtained, and when the formulas (5) and (8) are substituted into the formula (7), the formula (9) shown in FIG. 9 is obtained.

Therefore, an objective signal power included in the modified correlation value $\hat{s}_t$ is $a^2$, and when dispersion of n is N, a noise power is $mN/m^2 = N/M$. Namely, as the effect of the second embodiment of the present invention, the noise power included in the demodulation symbol can be reduced to $1/m$.

In the case where the symbol decided result $\hat{d}_t$ output from the symbol deciding means 221 is incorrect, the noise power is larger than $1/m$, but if the symbol decision error rate is in a practical level (not more than about 10%), an improved effect can be obtained.

As one example, when $d_t$ is a BPSK signal and its bit error rate is 8%, even in the case where a received symbol power is equal to a thermal noise power included in the symbol correlation value ($a^2 = N$), the noise power is improved (reduced) to 0.3 dB (0.92 times) when m=2, 0.9 dB (0.82 times) when m=4 and 1.4 dB (0.73 times) when m=8. Further, since m which is an average interval symbol length can be set freely, the characteristic can be improved by necessary amount.

Figure 11:
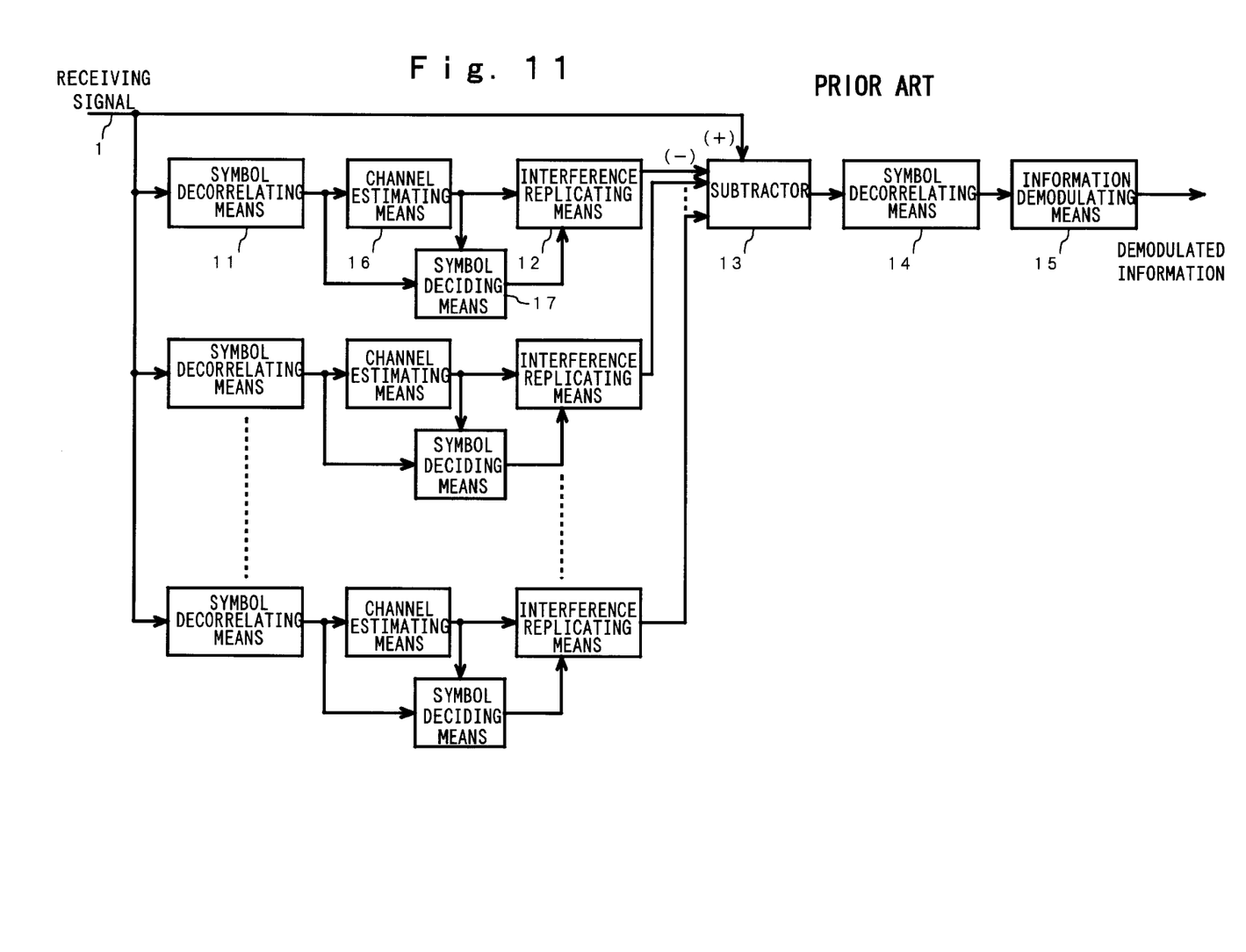
FIG. 11 is a block diagram showing another example of the conventional apparatus.

Meanwhile, in the conventional spread spectrum demodulator shown in FIG. 11, even if a symbol decision error does not exist, the accuracy of the replicated interference signal is determined approximately by the receiving power included in a pilot. For this reason, it is difficult to improve the quality only by means of the process on the receiving side. Moreover, if the symbol decision is incorrect, the symbol decided result is directly respread. For this reason, the accuracy of the replicated interference signal is deteriorated more greatly than in the second embodiment.

According to the present invention, the symbol correlation value of the interference signal is modified so that interference can be removed accurately.

Here, the above-mentioned first and second embodiments are only examples, and they are not related to an order of addition, subtraction, multiplication and division, and selection of a correlation average interval. Moreover, the present invention includes all means of modifying one or more symbol correlation values based on the plurality of symbol correlation values and symbol temporarily decided results.

In addition, when a relationship between a signal-to-noise power ratio of the symbol correlation value (SNR) and SNR of the modified symbol correlation value is the same as the relationship in SNR represented by the formulas (1), (4) or (9), this technique is equivalent to those in the above-mentioned embodiments.

The symbol decision normally means that a value taken by a transmission symbol is decided before final decision. However, even if a value to be taken by the symbol decided result is other than the value taken by the transmission symbol, the effect similar to that of the present embodiment can be obtained. As one example, even if a decision that a constant amount of offset is given to the value taken by the transmission symbol is made, the effect which is the same as those in the embodiments can be obtained. Moreover, if a total number of values taken by the symbol decided results is different form a total number of values taken by the transmission symbol, the effect similar to those in the present embodiments can be possibly obtained according to selection of the values to be taken.

In other words, the principal part of the present invention is such that a complex weighted average value (including real-number weighting and including the case where all weighting coefficients are 1) is obtained for the plurality of symbol correlation value at different times, and the symbol correlation values are modified. The averaging means and symbol deciding means cannot be modified, namely, the principle part cannot depart from the scope of the invention.

As mentioned above, according to the present invention, since the symbol correlation value is modified based on the decided result of the receiving symbol decided by the symbol deciding means, the interference signal where a noise level is small can be replicated. Moreover, for this reason, the replicated signal where the noise level is small is subtracted from the receiving signal or from a receiving signal from which a partial interference component has been removed so that the interference removing ability can be improved. Moreover, the present invention is applicable flexibly to a transmission system using no pilot symbol.

What is claimed is:

1. A spread spectrum signal demodulator for inputting spread spectrum signals and reducing a noise component included in respective demodulation symbols, comprising:

symbol decorrelating means for decorrelating symbol correlation values between spread codes allocated to spread spectrum signals and a receiving signal;

a symbol deciding means for deciding a transmission symbol based on the symbol correlation values decorrelated by said symbol decorrelating means; and correlation modification means for modifying the symbol correlation values based on the symbol decided result decided by said symbol deciding means.

2. A spread spectrum signal demodulator for inputting spread spectrum signals and reducing a noise component included in respective demodulation symbols, comprising:

symbol decorrelating means for decorrelating symbol correlation values between spread codes allocated to spread spectrum signals and a receiving signal;

a symbol with reliability deciding means for deciding a transmission symbol based on the symbol correlation values decorrelated by said symbol decorrelating means and outputting reliability of the symbol decided result; and correlation modification means for modifying the symbol correlation values based on the symbol decided result decided by said symbol with reliability deciding means.

3. The spread spectrum signal demodulator according to claim 1, wherein said symbol deciding means outputs hard decision data obtained by diversity-synthesizing the input symbol correlation values as the symbol decided result.

4. The spread spectrum signal demodulator according to claim 2, wherein said symbol with reliability decided means outputs soft decision data obtained by diversity-synthesizing the input symbol correlation values as the symbol decided result with reliability.

5. The spread spectrum signal demodulator according to claim 1, further comprising:

channel estimating means for estimating states of channels and outputting channel estimated values, wherein said symbol decided means or said symbol with reliability deciding means decides a transmission symbol based on the symbol correlation values and the channel estimated values.

6. The spread spectrum signal demodulator according to claim 2, further comprising:

channel estimating means for estimating states of channels and outputting channel estimated values, wherein said symbol decided means or said symbol with reliability deciding means decides a transmission symbol based on the symbol correlation values and the channel estimated values.

7. The spread spectrum signal demodulator according to claim 1, wherein said correlation modification means include:

a first symbol delay unit for delaying a one symbol correlation value by n symbol (n: two ore more integer);

a second symbol delay unit for delaying the symbol decided result by n symbol;

a first multiplication means for obtaining a product of the one symbol correlation value and a conjugate complex of the symbol decided result;

a second multiplication means for obtaining a product of the one symbol correlation value delayed in said first symbol delay unit and the symbol decided result delayed in said second symbol delay unit; and a means for obtaining an average value of the outputs of said first and second multiplication means and the one symbol correlation value delayed by m symbol (m: integer smaller than n) in said first symbol delay unit.

8. The spread spectrum signal demodulator according to claim 2, wherein said correlation modification means include:

a first symbol delay unit for delaying a one symbol correlation value by n symbol (n: two ore more integer);

a second symbol delay unit for delaying the symbol decided result by n symbol;

a first multiplication means for obtaining a product of the one symbol correlation value and a conjugate complex of the symbol decided result;

a second multiplication means for obtaining a product of the one symbol correlation value delayed in said first symbol delay unit and the symbol decided result delayed in said second symbol delay unit; and a means for obtaining an average value of the outputs of said first and second multiplication means and the one symbol correlation value delayed by m symbol (m: integer smaller than n) in said first symbol delay unit.

9. The spread spectrum signal demodulator according to claim 1, wherein said correlation modification means include:

a complex conjugate means for obtaining a conjugate complex of the symbol decided result;

a first multiplication means for multiplying the conjugate complex obtained by said complex conjugate means by one symbol correlation value;

an average means for averaging the multiplied result of said first multiplication means for symbols larger than 1;

a delay unit for delaying the symbol decided result; and a second multiplication means for multiplying the outputs of said average means and delay unit.

10. The spread spectrum signal demodulator according to claim 2, wherein said correlation modification means include:

a complex conjugate means for obtaining a conjugate complex of the symbol decided result;

a first multiplication means for multiplying the conjugate complex obtained by said complex conjugate means by one symbol correlation value;

an average means for averaging the multiplied result of said first multiplication means for symbols larger than 1;

a delay unit for delaying the symbol decided result; and a second multiplication means for multiplying the outputs of said average means and delay unit.

11. The spread spectrum signal demodulator according to claim 5, wherein said correlation modification means include:

a complex conjugate means for obtaining a conjugate complex of the symbol decided result;

a first multiplication means for multiplying the conjugate complex obtained by said complex conjugate means by one symbol correlation value;

an average means for averaging the multiplied result of said first multiplication means for symbols larger than 1;

a delay unit for delaying the symbol decided result; and a second multiplication means for multiplying the outputs of said average means and delay unit.

* * * * *